March 10, 1964 V. W. BALL 3,124,049
AUTOMATIC EXPOSURE CONTROL FOR CAMERA
Filed April 1, 1963 2 Sheets-Sheet 1

INVENTOR,
VINCENT W. BALL
BY *Harry M. Saragovitz*
ATTORNEY.

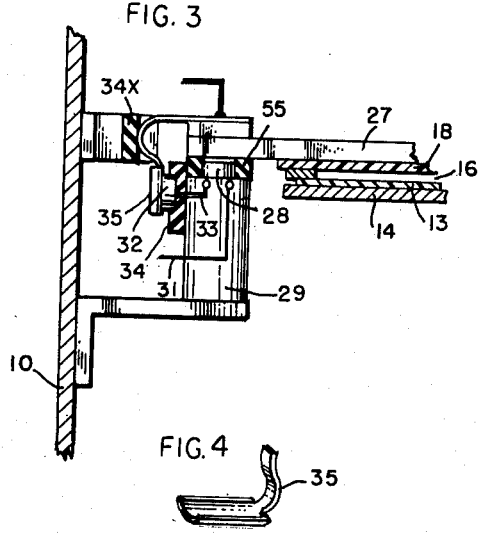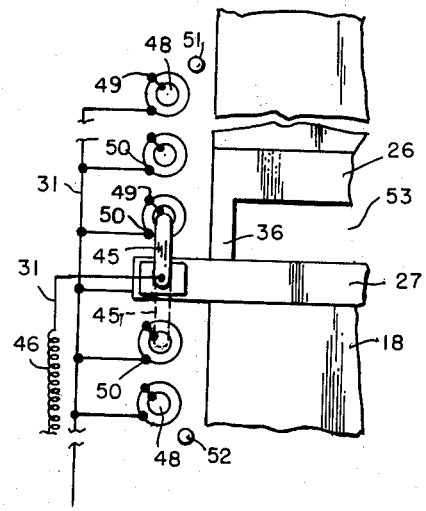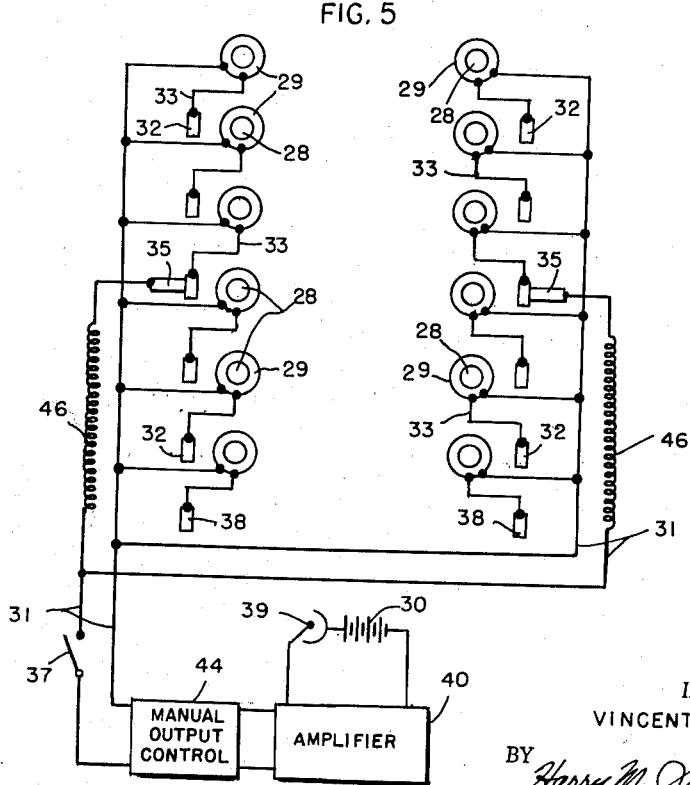

United States Patent Office 3,124,049
Patented Mar. 10, 1964

3,124,049
AUTOMATIC EXPOSURE CONTROL FOR
CAMERA
Vincent W. Ball, Allenhurst, N.J., assignor to the United States of America as represented by the Secretary of the Army
Filed Apr. 1, 1963, Ser. No. 269,826
4 Claims. (Cl. 95—10)
(Granted under Title 35, U.S. Code (1952), sec. 266)

The invention described herein may be manufactured and used by or for the Government for governmental purposes, without the payment of any royalty thereon.

The invention relates to a system and apparatus for taking pictures wherein the light intensity of the image focused upon the sensitive material is modulated automatically during the exposure period to compensate for abnormal high lights and shadows, and thus produce a picture wherein all areas thereof exhibit optimum clarity. In particular the invention relates to such modulation wherein the changing speed of a focal plane shutter acts as the light controlling means.

The apparatus of the invention is adapted to meet the exacting requirements of picturing such subjects as ground terrain from aircraft where it is essential that the smallest details be shown with optimum legibility. A high percentage of picture subject matter reflects very broad brightness ranges beyond the ability of photosensitive materials to record with clarity. A portion of the area of a normally exposed film may if it is carefully exposed in accordance with an integrated meter reading produce good visibility in the picture. However the remaining areas will in many cases receive an exposure which is greater or less than that which produces the required picture quality. The invention provides means for automatically and selectively rectifying those areas which would normally be over or under exposed while correctly exposed areas are not changed.

The required variations in exposure throughout the picture area are obtained by controlling the speed of a focal plane shutter while it traverses the picture format. As the exposing slot is slowed down exposure upon the film is increased and increased speed in the shutter curtain reduces exposure upon the film. To provide speed control for the shutter the invention includes a controllable electromagnetic drive for the curtain. Briefly described the drive comprises a linear series of electromagnets arranged in spaced alignment along the edge of the focal plane curtain and fixed to the camera casing. The magnets are so connected to a source of energy that the complete unit acts as a linear type electric motor. The end faces of the magnet cores lie in a common plane coinciding with the plane of the shutter. A ferrous armature is secured to the shutter curtain and extends into the plane of the end faces of the magnets and thus into the magnetic field thereof. The magnets are electrically connected to a power source in such a manner that they become successively energized as the armature approaches their core elements and demagnetized as the armature moves out of the magnetic field. The armature and consequently the shutter move to the next magnet which becomes magnetized. This cycle is repeated throughout the traverse of the shutter. The successive switching of the magnets on and off may be achieved in any suitable manner. As shown herein a contacting shoe fastened to the shutter moves in a path where it successively engages fixed contact points at each magnet which in turn completes a circuit to an energy source and thereby acts to energize the magnets one at a time in sequence. Thus the magnets produce a traveling magnetic field which carries the shutter along with it.

During its traverse the speed of the shutter curtain is varied by applying different voltages to the magnets as determined by a sensing device within the camera body the output of which is proportional to the light intensity reflected from a narrow strip having high reflectivity and extending along the edge of the exposing slot in the shutter curtain. The remaining area of the curtain and all interior surfaces of the camera must be non-reflective. The reflecting strip receives light from substantially the same portion of the image, focused by the camera lens, as that passing through the exposing slot in the curtain. Thus the instantaneous light intensity of successive narrow strips of the image is read by the sensor whose amplified output is fed to the magnets. A varying driving force is thereby imparted to the curtain with resulting changes in velocity thereof. Thus modulated the light flux is applied to the sensitive material such as a negative film. Localized exposure control throughout the picture area is thus established. A more detailed description of the structure and operation of the device will appear hereinafter.

It is a primary object of the invention to provide an automatic exposure control for selectively exposing local areas of the picture format to achieve a predetermined result.

A further object of the invention is to provide a focal plane shutter for cameras wherein the exposing slot is automatically driven at varying speeds during its exposing cycle to control exposure of the sensitive material at different portions of the image.

A further object of the invention is to provide automatic means to selectively correct undesirable contrast in a picture and to avoid changing contrast in those areas not requiring correction.

A still further object of the invention is to automatically control picture contrast in selected picture areas during initial photographic recording of the subject to provide optimum legibility in all areas of the resulting picture.

Other objects and features of the invention will more fully appear from the following description and will be particularly pointed out in the claims.

To provide a better understanding of the invention a specific embodiment thereof will be described and illustrated in the accompanying drawings wherein:

FIGURE 3 is a cross section on line 3—3 FIGURE 2.

FIGURE 4 is a detail illustration of the contact shoe used in the shutter driving motor.

FIGURE 5 is a diagrammatic detail view showing a modification of the driving motor.

FIGURE 6 is an electrical diagram of the driving motor and sensing means for the camera shutter.

Figure 1:
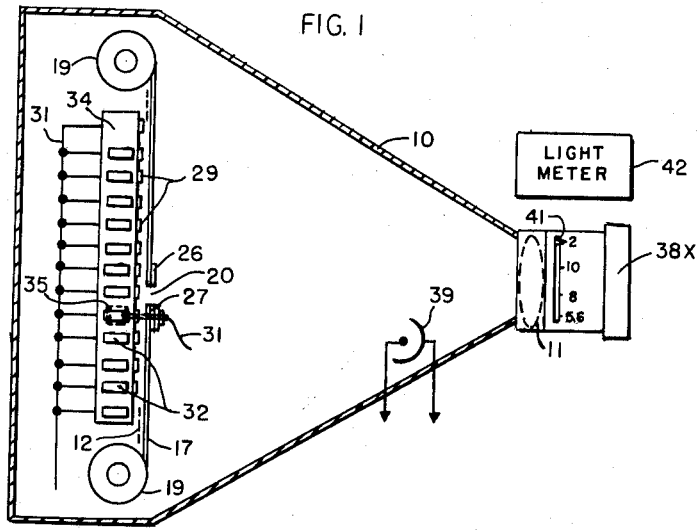
FIGURE 1 is a partially diagrammatic illustration of the invention.

The drawings illustrate a suitable structure which embodies the principles of the invention. Modifications thereof may be made within the spirit and scope of the appended claims. As shown the apparatus is desirably enclosed within a light tight casing 10 having a lens 11 at one end thereof which focuses the image of a subject upon the focal plane 12 situated at the other end of the casing. A sheet of film 13 is held at the focal plane by a backing plate 14. The format 15 of the picture is shown in dotted lines in FIGURE 2 and is established by an aperture plate 16 or any suitable means.

Exposure of the film 13 to the image projected by the lens 11 is effected by a focal plane type shutter 17. The shutter may consist of a light weight rigid or semirigid plate having an exposing slot therein or a flexible curtain type such as that shown in the drawing may be used in which the curtain 18 is supported upon a pair of rolls 19 which are arranged to permit free movement of the curtain in the focal plane. Exposure is made through the slot 20 in the curtain. The shutter is driven by a variable speed linear electromagnetic motor to be described in detail hereinafter.

To maintain the curtain in a substantially flat plane during its traverse of the picture format a slight tension is maintained therein. This may be done in any desired manner such as that shown herein. Pulleys 21 and 22 are respectively secured upon the shafts 23 and 24 of the rolls 19 and are interconnected by a belt 25 extending around the pulleys. In this manner when the curtain is driven the two rolls to which the curtain is secured are positively driven at the same speed thus preventing slackness in the curtain during its exposing and return travel.

A narrow strip 26 along the leading edge of the slot 20 is provided with a highly light reflecting and diffusion surface. The strip being substantially the same width as the slot. A strip of ferrous metal extends transversely across the curtain 18 and is secured thereto desirably but not essentially along the opposite edge of the slot. The strip constitutes the armature 27 of the electromagnetic driving motor.

The outer ends of the armature extend beyond the edges of the curtain and overlie rows of electromagnets 29 which are secured in position within the casing so that one end face of the cores 28 thereof lie in a plane close to that along which the end portions of the armature travels.

The magnets 29 on both sides of the curtain are individually and successively energized by an electrical circuit including a source of power having a battery. The power source is connected to the magnets by the leads 31 and has an on-off control switch 37. One terminal of the magnets are individually connected by leads 33 to contact plates 32 secured to insulating strips 34 at each side of the curtain secured parallel to the rows of magnets. The armature 27 has contact shoes 35 fixed to each of its ends. The shoes are made of thin metal to provide sensitive contact with plates 32, are insulated from the armature and have flexible cables connecting them with the other terminal of the power source. Guiding strips 34X engage and laterally guide the shoes 35. Referring to the wiring diagram in FIGURE 5 it will be noted that the leads 33 extend from the magnets to the contact plates 32 situated opposite to the next in line magnet in the direction of travel of the curtain.

Figure 2:
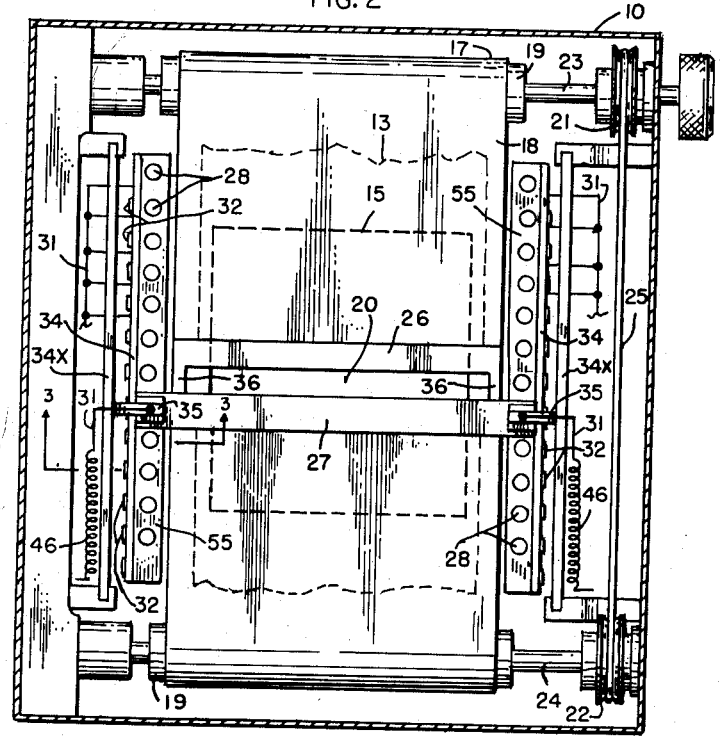
FIGURE 2 is a detail view of the structure of the camera shutter and its driving system.

Since the curtain is a unitary member, the two sections thereof on opposite sides of the slot being interconnected by narrow connectors 36, the whole curtain is driven when the armature is caused to move. It will be noted that there is one more contact plate 38 than there are magnets as shown in FIGURES 2 and 4 at the bottom of the row of contacts. To render the device inoperative the switch 37 is opened. To operate the device the curtain must be in its set position with the slot 20 completely off the picture format. This position is at the bottom of the curtain travel as the device is oriented in FIGURE 2. At this time the shoes 35 are contacting the bottom contact plates 38 which are connected to the first magnets. At this time also the armature is spaced from the magnet a distance such that the ends of the armature are within the outer portion of the magnetic fields of the first magnets. When the switch 37 is closed the armature moves toward the central axis of these fields. When it reaches this axis the relative position of the shoes 35 and their contact plates is such that further movement breaks the electric contact and the momentum of the curtain carries the shoes to the next contact plates to energize the next magnet which advances the armature again until the position is reached where no further forward force is acting thereon at which time the contact between the shoe and plate 32 is broken. The armature as before advances to the next magnet by reason of its momentum.

The timing of this succession of events is accurately adjusted by calculating the length of the contact shoes 32 and their spacing along the strip 34 in such manner that a traveling magnetic field is created which drives the curtain to expose the film. Desirably a stop engages the armature 27 at the end of its travel. To prepare the camera for another exposure a capping shutter 38X is closed and the curtain is returned to its initial position after which the capping shutter is opened. A knob on shaft 23 may be used to return the shutter. The exposed film is removed from its position at the picture taking camera format and an unexposed film put in place for the next exposure.

The foregoing described device provides a flexible means for operating the shutter wherein the speed of travel thereof at every instant may be made dependent upon the voltage of its input power and therefore the degree of exposure at every local area in the picture is subject to control. To provide this control a photo cell 39 or other light sensing means is secured within the camera casing 10 and oriented to receive only light components coming from the reflecting strip 26. These light components substantially represent the light flux value of that portion of the focused image which is passing through the slot 20 at a given instant. The output of the cell 39 is amplified in the amplifier 40 and then coupled to the activating circuits connected to the shutter driving motors through the leads 31. In this manner the flux density of the individual magnets is automatically varied in proportion to the instantaneous light intensity in each local area of the subject as the image of the subject is scanned by the shutter slot 20. The operation of the driving motor is influenced by the retarding effect of friction at the various points of contact between the relatively moving parts. The friction components as in any focal plane shutter overcome a tendency for the driving motor to cause a run away speed in the travel of the curtain 18. It is apparent the design of the motor and the adjustment of input energy may be such as to provide the desired function in the device.

The above control of light flux taking place during the exposure cycle acts to modulate the light admitted to the film through the lens 11. This modulation is superposed upon the unmodulated light component reaching the film through the lens 11 and tends to reduce the contrast of the image.

In operating the device an integrated light flux reading should be taken of the subject by a conventional light meter 42 or any suitable device situated outside the casing 10. From the speed of the film, the indicated light value, the slot width and shutter velocity a lens stop value is determined. An iris diaphragm 41 at the lens 11 is then set to the calculated stop value. Assuming the shutter is in its correct starting position with the shoes 35 contacting the lowermost contact plate 38, FIGURE 5, the switch 37 is closed which causes the armature to follow the traveling magnetic field above described to make the exposure. Automatic modulation takes place during the shutter traverse. When an intensely illuminated portion of the subject is scanned a relatively high controlling voltage is applied to the magnets which are receiving current from the shoes 35 thus applying increased driving force to the armature to thereby increase its speed and thus decrease the exposure of this portion of the film. When a dimly illuminated portion of the image is scanned the driving force applied to the shutter is reduced thus increasing the exposure of this portion of the film. The developed film will thus present clearly all the fine detail in the image high lights and shadows.

By proper design of the apparatus it may be made to function to provide a wide range of contrast correction such as the equivalent of two lens stop openings. The system is however very flexible and may be adjusted to selectively provide abnormal distortion in contrast to fulfill a special requirement.

To provide for this selective feature in contrast control, a manual control 44 may be provided to vary the effective output of the amplifier 40.

Various circuit arrangements may be made to accomplish desired functions in the system of the invention. A departure from the device described above is illustrated in FIGURE 6. In this construction the shutter may be operated in either direction to execute an exposure.

To achieve this result a contact shoe 45 is pivotally secured to the curtain adjacent its slot and is electrically connected to the energizing circuit containing the photo cell 39, and amplifier 40 by a flexible lead 46 as in the above described construction shown in FIGURE 2.

The electromagnets are positioned in the same manner as shown in FIGURE 2. In this variation of the invention the magnet cores 48 are used as contacts over which the spring type shoe 45 moves. To drive the curtain upwardly as shown in FIGURE 6 the starting position thereof is such that, with the shoe 45 swivelled into its vertically upward position, the armature 27 is positioned substantially at the first magnet and the outer end of the shoe is contacting the core of the second magnet. In this construction it should be noted that the outer end portion of the shoe is shaped to present only a relatively short length of contact with the core similar to the shoes 35.

The core of each magnet is electrically connected to one terminal 49 of its coil while the other terminal 50 of each magnet is connected to the other side of the energizing circuit. The remaining portion of the circuit, not shown in FIGURE 6, is the same as that shown in FIGURE 5. When the switch 37 is closed only the second magnet is energized which acts to draw the armature and the curtain slot upward. When the armature reaches a point just before the central axis of the magnetic field the shoe contact rides off the core to open the circuit after which the curtain is carried along by momentum until the shoe contacts with the core of the next magnet and the propelling cycle is repeated throughout the exposure. At the end of the curtain travel the shoe rides off its contact with the last magnet and the curtain is stopped by a stop pin 51 engaged by the armature 27 or by other means. The armature and the curtain have now reached the end of their travel at which time the slot 53 has run off the picture format and the exposure is complete. The switch 37 is then opened.

Throughout the exposure the current successively fed to the individual magnets is controlled by the energy source which in turn is controlled by the photo cell in the same manner as in the system of FIGURES 1 and 2.

The next exposure may be made on an unexposed sheet of sensitive material may be made without returning the shutter curtain to the first position. To accomplish this result the shoe 45 is pivoted into a vertically depending position as viewed in FIGURE 6. When the switch 37 is now closed the curtain will travel in the opposite direction motivated in the same manner as during the prior exposure cycle and will come to rest with the armature contacting the stop pin 54.

Referring to the structure shown in FIGURE 2 successive contacts with individual magnets may be made by constructing the guiding strips 34X of metal and insulating the strips from the camera case. A connection may, in this case, be made to this strip to take the place of a flexible lead which completes the motor energizing circuit. In this case the sliding contact of the shoes 35 with the strips completes the circuit.

Referring to FIGURES 2 and 3 there is shown a structure which may not be necessary to the operation of the device but will improve its operation. Strips 55 of non-magnetic material such as brass or plastic are secured along the top of the rows of magnets 28. The strips are provided with apertures into which the upper ends of the magnet cores 29 extend partway of the thickness of the strip see FIGURE 3.

In this structure the armature 27 rides upon the strips 55 and is guided in a plane slightly spaced from the faces of the cores. Thus the component of friction due to direct contact of armature and magnets when they are energized is avoided.

What is claimed is:

1. In a photographic camera means to control the quantity of light reaching the film at different areas thereof during an exposing cycle comprising a lens for focusing an image upon a focal plane, a focal plane shutter having a slot therein, a linear type electromagnetic motor acting to drive said shutter, light sensing means operable to read light flux values of the image at successive positions of said slot in said shutter, an energy source connected to actuate said motor, means to control the output of said source in accordance with the output of said sensing means whereby the changes in speed of travel of the shutter will control the exposure upon the film.

2. A camera according to claim 1 and wherein the said motor includes a linear row of electromagnets fixed to the camera casing and an armature fixed to said shutter and moving in a plane close to the core of said magnets.

3. A photographic camera comprising a casing for containing and supporting the components thereof, a lens for focusing an image upon a focal plane, a focal plane shutter having a transverse slot therein to effect exposure of the sensitive material, a light reflecting strip having a width substantially that of said slot and located at the edge of said slot, a linear type electromagnetic motor having a plurality of electromagnets arranged along the edge of said shutter, an armature fixed to said shutter and projecting into the magnetic fields of said magnets, a source of electric energy, switching means acting successively to connect said source of electric energy to said magnets to produce a traveling magnetic field acting to propel said armature and shutter, a sensing means in said casing receiving only light passing said lens and reflected from said reflecting strip and a connection from said sensor to said energy source whereby the output of the sensor controls said energy source and consequently the speed of said shutter throughout its exposing cycle.

4. A photographic camera according to claim 3 and wherein successive connection to the magnets is made by a traveling contact on said shutter.

References Cited in the file of this patent
UNITED STATES PATENTS

| | | |
|---|---|---|
| 2,842,025 | Craig | July 8, 1958 |
| 2,996,952 | Orlando | Aug. 22, 1961 |
| 3,020,816 | Frenk | Feb. 13, 1962 |